United States Patent [19]

Leibowitz

[11] 4,127,853
[45] Nov. 28, 1978

[54] ELECTROCHROMIC DISPLAY ADAPTED FOR MULTIPLEXING

[75] Inventor: Marshall Leibowitz, Englewood, N.J.

[73] Assignee: Timex Corporation, Waterbury, Conn.

[21] Appl. No.: 676,030

[22] Filed: Apr. 12, 1976

[51] Int. Cl.² .............................................. G09F 9/32
[52] U.S. Cl. ................................. 340/336; 340/378 R; 340/324 R; 350/357
[58] Field of Search ............... 340/324 R, 336, 378 R, 340/324 EC; 350/160 R, 160 LC, 357

[56] References Cited

U.S. PATENT DOCUMENTS

| | | | |
|---|---|---|---|
| 3,892,472 | 7/1975 | Giglia | 350/160 R |
| 3,957,352 | 5/1976 | Leibowitz | 350/160 R |
| 3,975,726 | 8/1976 | Kawakami | 340/336 |
| 3,981,560 | 9/1976 | Heyman et al. | 350/160 R |
| 3,994,568 | 11/1976 | King et al. | 350/160 LC |

*Primary Examiner*—David L. Trafton
*Attorney, Agent, or Firm*—Lawrence Hager

[57] ABSTRACT

An electrochromic display cell having in sandwich layered form a first transparent substrate with a plurality of digits each being formed thereon by a plurality of selectively energizable transparent electrodes and an electrochromic layer on each of the transparent electrodes, a second substrate with a plurality of separate and selectively energizable counter-electrodes each being associated with a digit, and a separate electrolyte layer between each counter-electrode and its associated digit.

In the preferred embodiment, each corresponding transparent electrode of each digit is interconnected on the first transparent substrate to form groups of commonly energized segments with each group having a single electrical connection to/from the display.

12 Claims, 4 Drawing Figures

ELECTROCHROMIC DISPLAY ADAPTED FOR MULTIPLEXING

BACKGROUND OF THE INVENTION

This invention relates to electrochromic displays and more particularly to electrochromic displays adapted for multiplexing of electrode-segments and counter-electrodes.

In recent years a great deal of interest has been shown in the provision of electrochromic displays having, for example, a digital readout such as in U.S. Pat. No. 3,839,857 issued Oct. 8, 1974 to Donald Joseph Berets, et al.

Typically, the prior art electrochromic displays consist of a cell having indicia each formed by a plurality of electrode-segments which are coated with an electrochromic material, said electrode-segments each being separately connected to/from the display for separate energization thereof, a single common electrode associated with a plurality of indicia, and a single electrolyte layer associated with said plurality of indicia and the common electrode. However, these prior art electrochromic displays had many drawbacks such as requiring a large number of electrical connections to the display and the inability to multiplex because of cross-talk, i.e., leakage current, which may cause unwanted activation of other electrode-segments.

As is known to those skilled in the art of producing electrodes and leads, each input point to electrical apparatus, such as an electrochromic display, is a potential trouble point and thus the elimination of input points is an elimination of potential trouble points, and accordingly, it is most desirable to provide electrical apparatus, such as an electrochromic display, with a minimum of electrical input points.

Accordingly, it is an object of the present invention to provide an electrochromic display adapted for multiplexing of electrode-segments with separate counter-electrodes and reducing the lead or electrical connections to/from and on the electrochromic display.

It is a further object of the invention to provide a new and improved electrochromic display device having a plurality of electrically isolated counter-electrodes.

An electrochromic display comprising in sandwich layered form a first transparent substrate with a plurality of indicia formed thereon, said indicia each consisting of a plurality of selectively energizable transparent electrodes with each corresponding transparent electrode in each indicia being interconnected on the first transparent substrate to form groups of commonly energizable segments with each group having a single or common electrical connection to/from the display, a layer of electrochromic material on each of the transparent electrodes, a second substrate with a plurality of separate counter-electrodes each being associated with an indicia and electrically isolated from all other counter-electrodes, and a separate electrolyte layer between each counter-electrode and its associated digit.

BRIEF DESCRIPTION OF THE DRAWINGS

Other objectives of the present invention will be apparent from the following detailed description of the preferred embodiments of the present invention, the description being taken in conjunction with the accompanying drawings. Like numerals refer to like parts throughout.

DETAILED DESCRIPTION OF THE INVENTION

Figure 1:
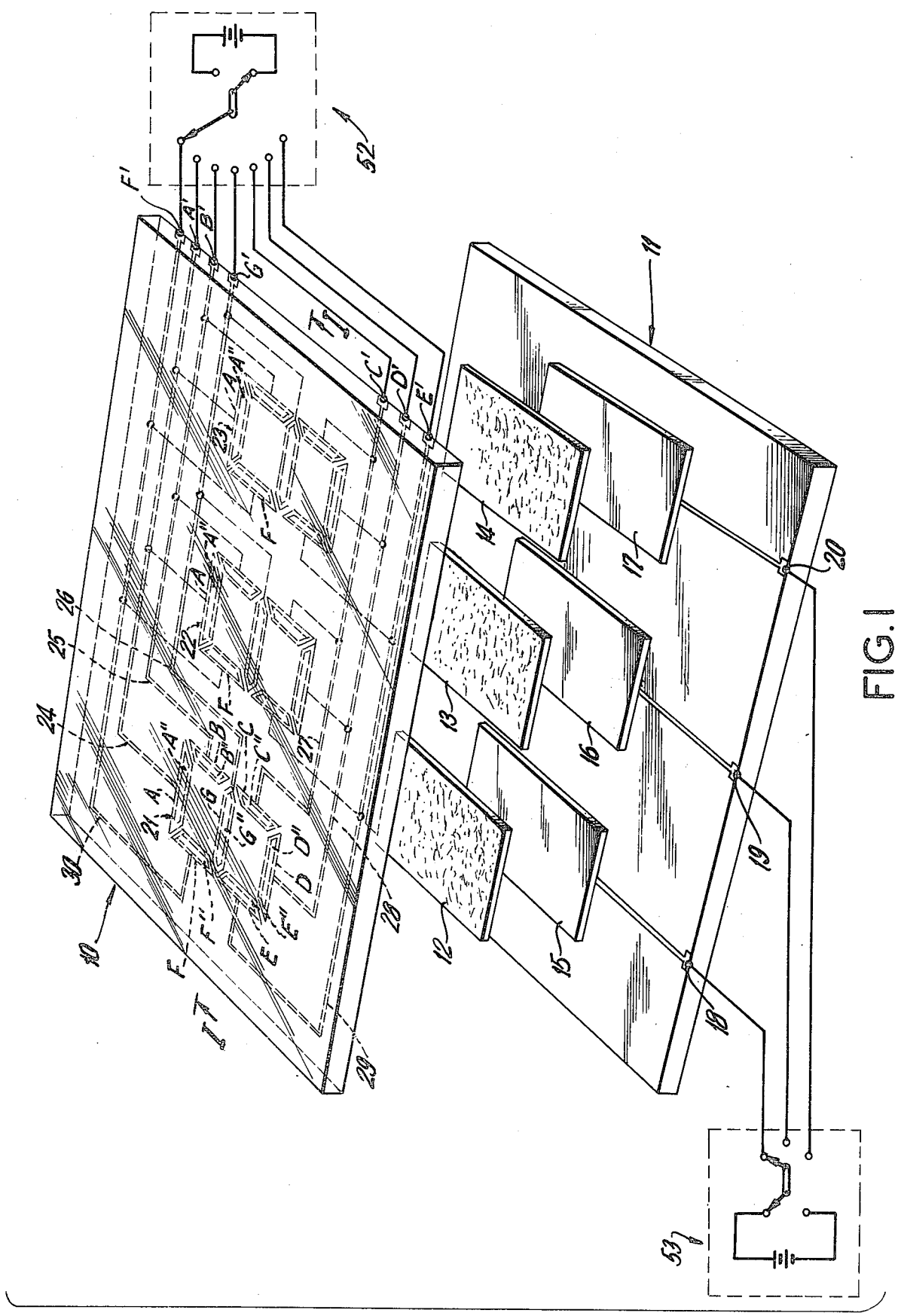
FIG. 1 is an exploded perspective view of an electrochromic display incorporating the present invention.
Figure 2:
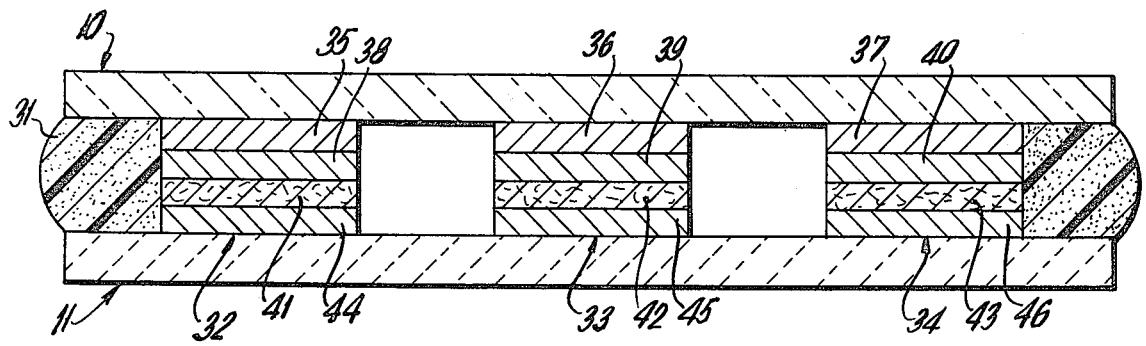
FIG. 2 is an enlarged cross sectional view taken through an assembled display of this type shown in FIG. 1 along the line I—I.

The electrochromic display device as shown in FIGS. 1 and 2 uses a well-known phenomenon as is described in U.S. Pat. No. 2,319,765 issued May 18, 1943 to Talmey and U.S. Pat. No. 1,068,744 issued July 29, 1913 to Hutchison and U.S. Pat. No. 3,944,333 issued Mar. 16, 1976 to Leibowitz.

Briefly stated, if a layer of an electrochromic material is disposed between, on or over at least one of a pair of electrodes and/or forms a part thereof, across which a potential is applied, the light reflective and transmitting characteristics of the material will change. If the electrodes and the electrochromic film are provided on a surface of a transparent glass plate, the light transmitting ability of the combination can be varied by the application of an electric field across the electrochromic material turning it darker, for example, decreasing its light transmitting ability over the area of the electrode and electrodes energized.

Referring now to FIG. 1 of the drawings, the electrochromic display device is shown as a sandwich-like structure comprising a first transparent substrate 10 and a second spaced substrate 11, which need not be transparent and a plurality of separator-electrolyte layers, 12, 13, 14 between the substrates 10 and 11.

The lower substrate 11 is formed, for example, from an opaque ceramic or a transparent material such as NESA glass and coated with a reflective or light opaque finish on its outside surface. The inner surface is coated or overlaid in several areas with a suitable conductive layer to form separate and electrically isolated counter-electrodes 15, 16 and 17 each connected to a terminal 18, 19 and 20, respectively. The counter-electrodes 15, 16, 17 are electrically insulated from each other due to the insulating qualities of the lower substrate 11 and the spacing between each counter-electrode 15, 16, 17.

The inner surface or underside of the upper substrate 10 has formed thereon a conductive pattern of transparent electrode-segments. The conductive electrode-segments are arranged to form, for example, a plurality of seven segment arrays such as segments A thru G which can be selectively actuated to form a plurality of digits 21, 22 and 23 or other optical patterns via conductive leads 24 thru 30, respectively. Each electrode-segment of each indicia/digit is electrically connected to the corresponding and similarly designated electrode-segments in each digit 21, 22, 23 via a conductor lead. For example, conductor lead 24 is electrically connected to segment A and conductor lead 29 is electrically connected to segment E in each of the digits 21, 22 and 23.

The upper substrate 10 may be of transparent glass or plastic with the transparent electrode-segments A thru G and the conductor leads 24 thru 30 formed thereon of a clear or transparent, conductive material such as tin oxide.

Coated on the transparent electrode-segments A thru G of each digit 21, 22, 23 is a layer of electrochromic material A" thru F", respectively. The electrochromic layers A" thru F" are applied by suitable masking techniques to cover, for example, a smaller area than the electrodes so as to give good edge definition.

There are many suitable electrochromic materials such as is disclosed in U.S. Pat. No. 2,319,765 issued to Talmey which change their colors according to the particular oxide state. Therefore, since suitable materials are well known to those skilled in the art, no further discussion of these materials will be provided herein to avoid prolixity.

The two substrates 10 and 11 are assembled in a sandwich-like structure in which the digits 21, 22, 23 and the counter electrodes 15, 16, 17 respectively are in face-to-face arrangement in the cell cavity.

In accordance with the first preferred embodiment of the invention, a substantially solid separator-electrolyte layer is provided between each digit and its corresponding or associated counter-electrode. The details of the separator-electrolyte layer are described in copending commonly assigned U.S. patent application Ser. Nos. 616,224 filed Sept. 24, 1975, now abandoned, and Ser. No. 609,256 filed Sept. 2, 1975, now U.S. Pat. No. 3,957,352, and U.S. Pat. No. 3,944,333, each filed in the name of Marshall Leibowitz and the teachings of these copending applications and patent are incorporated herein by reference.

Briefly, each solid electrolyte forms a separator-electrolyte layer between the two substrates on the order of 25 microns in thickness. The solid electrolyte utilized in this invention is a selectively permeable and insoluble cationic ion exchange resin. Before or after assembly, the separator-electrolyte should be chemically wet by dipping in water or in very dilute acid such as dilute sulfuric acid.

As indicated, the resin may be in the form of a solid membrane layer or powdered cation ion exchange resin in the hydrogen form. Preferred cationic ion exchange resins are familiar to those skilled in the art and particularly preferred are Rohm and Haas Amberlite IR-20 and CG-50 and most especially preferred is duPont Nafion perfluorosulfonic acid resin because of its great inertness at processing temperatures. Other suitable resin membranes are Fisher Scientific's Rexsyn sulfonated polystyrene in hydrogenated form.

The cationic ion exchange resins in powder form can be used by themselves or with pigments and other additives and/or by mixing with various binders or simply filling the space between the two conductive electrochromic areas with the finely powdered cationic resin particles and enclosing with adhesive about the periphery of the display sandwich.

It should be recognized, however, that the electrolyte layer can take any form, for example, a solid membrane layer or powdered cation ion exchange resin in the hydrogen ion form or a liquid or gel so long as the display can be prepared with substantially electronic and ionic isolated and separated conducting sandwich-like indicia areas. Therefore, the phrase "layer of electrolyte material" is used hereafter to define a discrete island or area of electrolyte material which is associated with a display indicia or digit or part thereof. The separate and isolated sandwich-like indicia areas provide a multiplexing capability to the display, and substantially eliminated cross-talk, i.e., unwanted current flow — ionic or electronic — between separate indicia, and thereby provides improved clearity of the display images or indicia or digits.

As is known in the art, current flow in one direction through the electrolyte will cause the electrochromic material to darken, while current flow in the opposite direction will cause it to "erase" or become transparent. This is in contrast to displays which operate through application of an electric field such as field effect and dynamic scattering liquid crystal displays.

Thus, in accordance with the invention an electrochromic display arrangement is provided which is capable of being matrix energized for actuating the digits to display, for example, time information. The digits are actuated by the application of a potential coincidentally across one or more electrode-segments A thru G, via conductor leads 24 thru 30, and a counter-electrode associated with the digit/electrode-segment by applying the potential to the proper display terminal A' thru G' and to the proper counter electrode 15 and/or 16 and/or 17. For example, each electrode-segment F in each digit 21, 22, and 23 is shown as being selectively energized, as a group of electrode-segments, via a multiple switch contact and voltage source arrangement 52 and counter-electrode 18 is being selectively energized via a similar switch and voltage source arrangement 53 to cause electrode-segment F in digit 21 to be actuated.

Referring to FIG. 2 of the drawing, an assembled display according to the present invention is shown in cross section. The substrates 10 and 11 are bound to one another by an adhesive 31 such as epoxy which serves to hold the assembly together and to seal the inner layers around the periphery of the sandwich-like structure between the substrate 10 and 11.

The three sandwich-like structures 32, 33 and 34 correspond to digits 21, 22 and 23 respectively in cross section along lines I—I. Each sandwich-like structure, as hereinbefore stated, comprises a first substrate 10, an electrode-segment pattern 35, 36, 37, a layer of electrochromic material 38, 39, 40 on each electrode-segment, a separator-electrolyte layer 41, 42, 43, and a counter-electrode 44, 45, 46 each being associated with a digit 21, 22, 23 respectively, and a second substrate 11. The sandwich-like structures 32, 33 and 34 are spaced apart to provide substantially electrical and ionic isolated and separated-sandwich like conducting areas.

Figure 3:
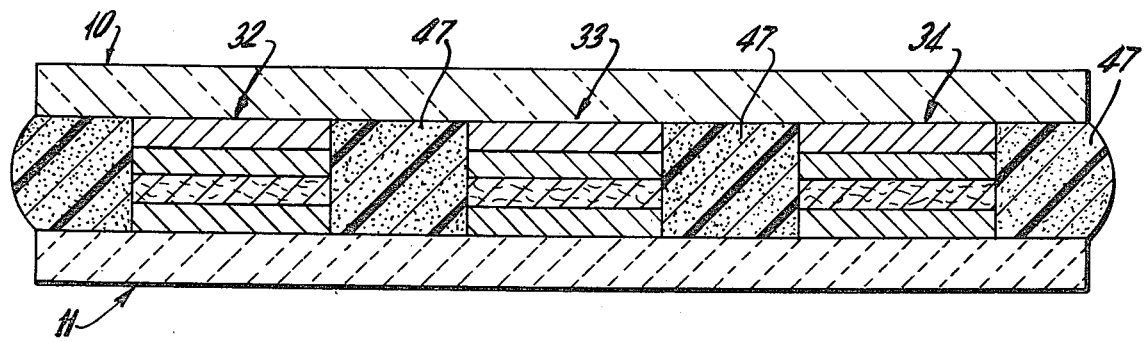
FIG. 3 is an enlarged cross sectional view of another embodiment of the present invention.

The display shown in cross sectional view in FIG. 3 is similar to the display shown in FIGS. 1 and 2 with the difference being that a transparent or opaque and insulating material 47 is provided between the digit conducting areas. This is particularly desirable if a liquid electrolyte is employed.

Figure 4:
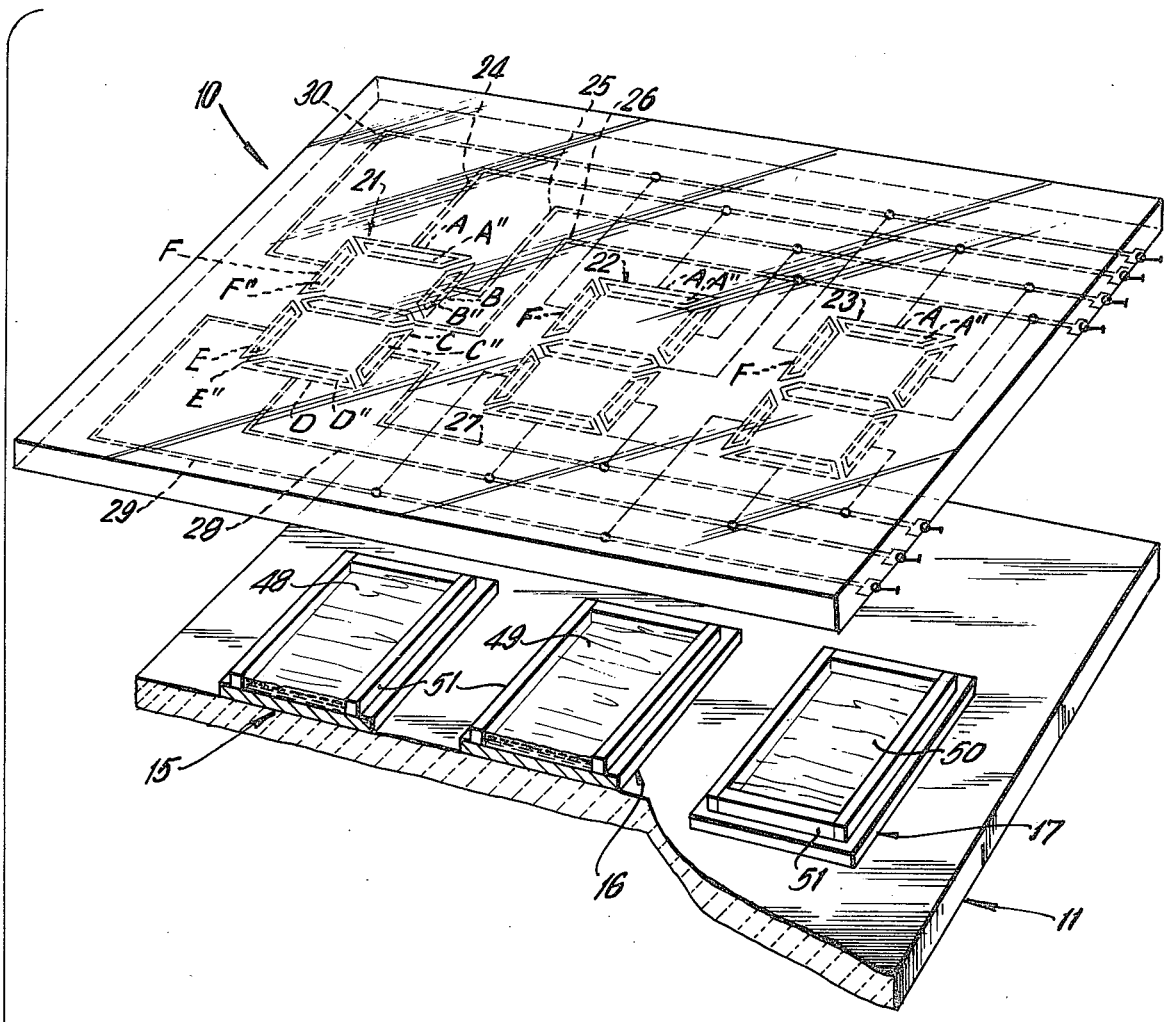
FIG. 4 is an exploded perspective view, partially cutaway, of a third embodiment of the present invention.

The display shown in FIG. 4 is generally similar to the display shown in FIGS. 1, 2 and 3 with the difference being that separate and isolated pools or islands 48, 49 and 50 of a liquid or gel electrolyte are provided for each associated digit. The pools of liquid or gel electrolyte are contained by the side walls 51 and the sandwich structure of the substrates 10, 11. The side walls 51 can be formed from any suitable material such as a transparent or opaque epoxy or gasket-like material.

It is not necessary to the functioning of the display according to the invention that a single electrochromic layer be applied. For example, the counter-electrode can be coated with the same or substantially the same electrochromic material as is utilized on the digit segments.

While the invention has been described with respect to three preferred embodiments, it should be apparent to those skilled in the art that numerous modifications may be made thereto, such as using other methods or means of providing isolated and separated digit or pattern and counter-electrode conducting areas or islands, without departing from the spirit and scope of the invention.

I claim:

1. An electrochromic display device comprising in layered form:

a first transparent substrate with at least a first and second indicia each being formed thereon by at least one selectively energizable electrode-segment and an electrochromic layer on each said electrode-segment;

a second substrate with at least a first and second isolated and selectively energizable counter-electrode, said first counter-electrode being associated with said first indicia and said second counter-electrode being associated with said second indicia;

a first separate layer of electrolyte material comprising a powdered cationic ion exchange resin in the hydrogen ion form between said first indicia and associated first counter-electrode; and a second separate layer of electrolyte material comprising a powdered cationic ion exchange resin in the hydrogen ion form between said second indicia and associated second counter-electrode.

2. An electrochromic display device as in claim 1, wherein:

the first and second indicia are digits with each digit being comprised of a plurality of selectively energizable electrode-segments.

3. An electrochromic display device as in claim 2, wherein:

each digit is comprised of seven electrode-segments and each corresponding electrode-segment in each said digit is electrically interconnected to form seven selectively energizable groups of electrode-segments with each group containing only one electrode-segment in each of the digits.

4. An electrochromic display device as in claim 1, wherein:

the counter-electrodes are isolated by forming each indicia and associated counter-electrode and associated layer of electrolyte into separate sandwich-like layers spaced apart between the two substrates.

5. An electrochromic display device comprising in layered form:

a first transparent substrate with at least a first and second indicia each being formed thereon by at least one selectively energizable electrode-segment and an electrochromic layer on each said electrode-segment;

a second substrate with at least a first and second isolated and selectively energizable counter-electrode, said first counter-electrode being associated with said first indicia and said second counter-electrode being associated with said second indicia;

a first separate layer of electrolyte material comprising a perfluorosulfonic acid polymer membrane between said first indicia and associated first counter-electrode; and a second separate layer of electrolyte material comprising a perfluorosulfonic acid polymer membrane between said second indicia and associated second counter-electrode.

6. An electrochromic display device as in claim 5, wherein:

the first and second indicia are digits with each digit being comprised of a plurality of selectively energizable electrode-segments.

7. An electrochromic display device as in claim 5, wherein:

each digit is comprised of seven electrode-segments and each corresponding electrode-segment in each said digit is electrically interconnected to form seven selectively energizable groups of electrode-segments with each group containing only one electrode-segment in each of the digits.

8. An electrochromic display device as in claim 5, wherein:

the counter-electrodes are isolated by forming each indicia and associated counter-electrode and associated layer of electrolyte into separate sandwich-like layers spaced apart between the two substrates.

9. An electrochromic display device comprising a layered form:

a first transparent substrate with at least a first and second indicia each being formed thereon by at least one selectively energizable electrode-segment and an electrochromic layer on each said electrode-segment;

a second substrate with at least a first and second isolated and selectively energizable counter-electrode, said first counter-electrode being associated with said first indicia and said second counter-electrode being associated with said second indicia;

a first separate layer of electrolyte material comprising an insolubilized polystyrene sulfonic acid polymer membrane between said first indicia and associated first counter-electrode; and a second separate layer of electrolyte material comprising an insolubilized polystyrene sulfonic acid polymer membrane between said second indicia and associated second counter-electrode.

10. An electrochromic display device as in claim 9, wherein:

the first and second indicia are digits with each digit being comprised of a plurality of selectively energizable electrode-segments.

11. An electrochromic display device as in claim 9, wherein:

each digit is comprised of seven electrode-segments and each corresponding electrode-segment in each said digit is electrically interconnected to form seven selectively energizable groups of electrode-segments with each group containing only one electrode segment in each of the digits.

12. An electrochromic display device as in claim 9, wherein:

the counter-electrodes are isolated by forming each indicia and associated counter-electrode and associated layer of electrolyte into separate sandwich-like layers spaced apart beteen the two substrates.

* * * * *